UNITED STATES PATENT OFFICE.

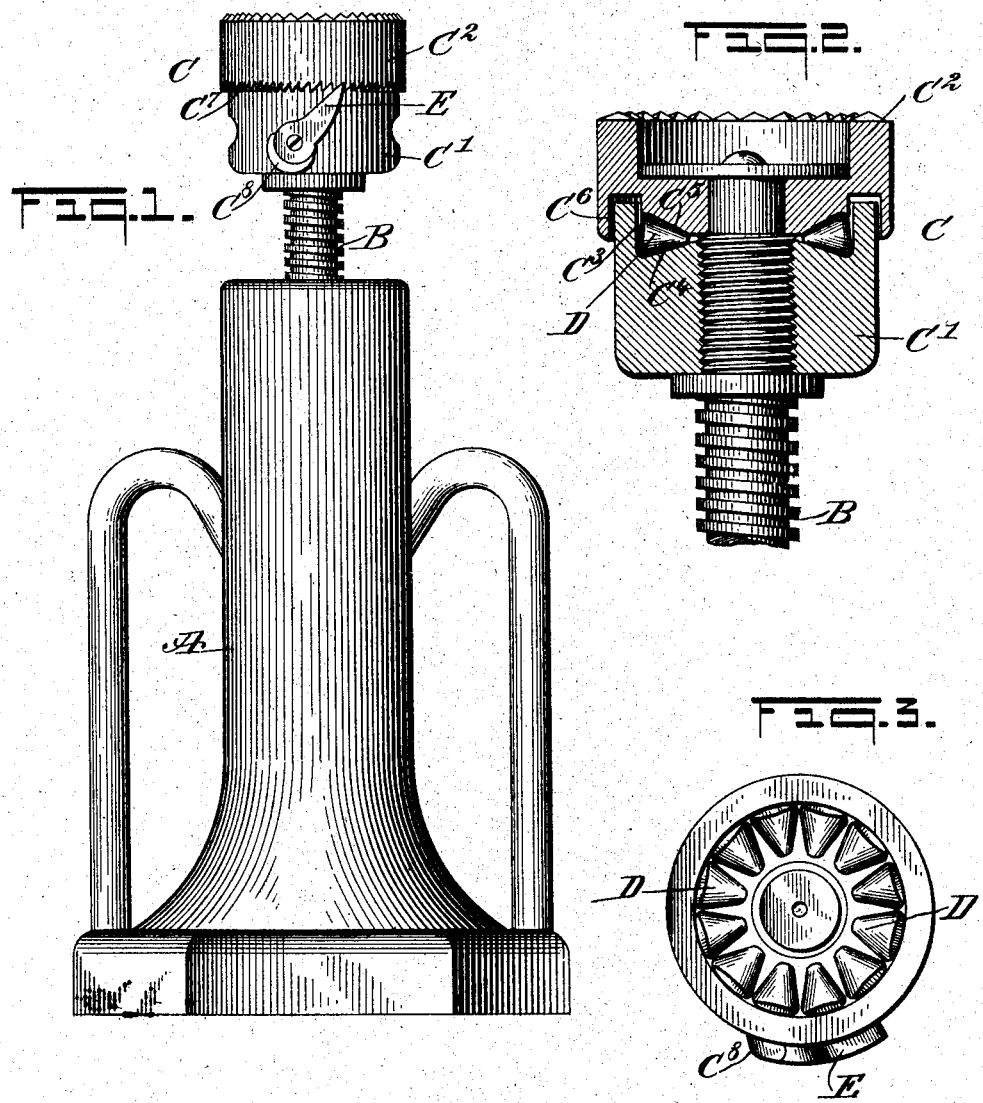

ELI H. GOODWIN, OF OLYMPIA, WASHINGTON, ASSIGNOR OF ONE-HALF TO O. V. LINN, OF OLYMPIA, WASHINGTON.

SCREW LIFTING-JACK.

No. 796,204.  Specification of Letters Patent.  Patented Aug. 1, 1905.

Application filed January 17, 1905. Serial No. 241,418.

*To all whom it may concern:*

Be it known that I, ELI H. GOODWIN, a citizen of the United States, and a resident of Olympia, in the county of Thurston and State of Washington, have invented a new and Improved Screw Lifting-Jack, of which the following is a full, clear, and exact description.

The object of the invention is to provide a new and improved screw lifting-jack arranged to reduce the friction between the members of the head to a minimum, to increase the lifting-power of the jack, and to prevent backing up of the screw-rod when the jack is under a load.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is an enlarged sectional side elevation of the screw-rod and its head. Fig. 3 is a plan view of the same, the top member of the head being removed; and Fig. 4 is an enlarged perspective view of one of the bearing-rollers.

In the stand A of the lifting-jack screws a screw-rod B, provided at its upper end with a head C, having a fixed member $C'$, secured to the screw-rod B, and a movable member $C^2$, adapted to engage with its top surface the load to be carried by the lifting-jack. Conically-shaped friction-rollers D are interposed between the members $C'$ and $C^2$ of the head C, and for this purpose the upper end of the fixed member $C'$ is provided with a recess $C^3$ for receiving the friction-rollers D, the bottom or bearing surface $C^4$ of the recess $C^3$ being cone-shaped to correspond with the sides of the friction-rollers D. The bearing-surface $C^5$ on the under side of the rotating member $C^2$ likewise corresponds with the sides of the rollers D, which latter are rounded off at their base ends to engage corresponding rounded-off portions on the surfaces $C^4$ and $C^5$ to prevent spreading of the rollers, thus avoiding undue friction, as the base-surfaces of the rollers cannot come in contact with the side wall of the recess $C^3$. (See Fig. 2.)

The rotating member $C^2$ of the head C is provided with an annular flange $C^6$, extending on the outside of the upper portion of the fixed member $C'$, to act as a dust-cap in order to prevent dust from passing to the bearing-surfaces and friction-rollers. The lower edge of the flange $C^6$ is formed with ratchet-teeth $C^7$, adapted to be engaged by a pawl E, fulcrumed on the fixed member $C'$ and serving to prevent accidental return movement of the screw B when the lifting-jack is under a load—that is, when the member $C^2$ is engaged with the part to be lifted and held against turning. It is understood that when the member $C^2$ is held against turning and the pawl E is in engagement with one of the ratchet-teeth $C^7$ then the member $C'$ and the screw-rod B are prevented from turning in a backward direction. The fulcrum end of the pawl E is held in a bearing $C^8$, formed integrally on the member $C'$, fixed on the screw-rod, the said bearing limiting the downward swinging motion of the pawl E.

Having thus described my invention, I claim as new and desire to secure by Letters Patent—

1. A lifting-jack comprising a stand, a screw-rod screwing therein and provided with a head having a fixed and a rotating member, cone-shaped rollers interposed between the fixed and movable members, the bearing-surfaces of the said members conforming to the shape of the cone rollers, and a pawl-and-ratchet connection between the said members.

2. A lifting-jack comprising a stand, a screw-rod screwing therein and provided with a head having a fixed and a rotating member, and a pawl-and-ratchet connection between the said members, whereby accidental return movement of the screw-rod is prevented.

3. A lifting-jack, comprising a stand, a screw-rod, a two-part head on the upper end of the screw-rod, the lower part being fixed and having in its upper face a cone-shaped recess and the upper part being pivoted and having in its lower face a cone-shaped recess, the lower part being also provided with an annular flange having teeth on its lower edge, cone-shaped rollers in the recesses of the parts of the head, and a pawl pivoted to the fixed part of the head and engaging the ratchet-teeth of the upper part.

4. A lifting-jack comprising a stand, a screw-rod screwing therein and provided with a head having a fixed and a rotating member, the latter having an annular flange fitting the outer upper portion of the fixed member, the said flange having ratchet-teeth at the lower edge, and a pawl fulcrumed on the said fixed member and in engagement with the said ratchet-teeth.

5. A lifting-jack comprising a stand, a screw-rod screwing therein and provided with a head having a fixed and a rotating member, and cone-shaped rollers interposed between the fixed and movable members, the base ends of the cones being rounded off, the bearing-surfaces of the said members conforming to the shape of the cone rollers.

In testimony whereof I have signed my name to this specification in the presence of two subscribing witnesses.

ELI H. GOODWIN

Witnesses:
    WALTER CROSBY,
    F. G. BLAKE.